United States Patent [19]
Rogers et al.

[11] Patent Number: 5,540,190
[45] Date of Patent: Jul. 30, 1996

[54] GAS HYDRATE STORAGE SYSTEM AND METHOD FOR USING THE GAS HYDRATE STORAGE SYSTEM IN AUTOMOTIVE VEHICLES

[75] Inventors: Rudy E. Rogers; Gilbert Y. Yevi, both of Starkville, Miss.

[73] Assignee: Mississippi State University (MSU), Mississippi State, Miss.

[21] Appl. No.: 314,689

[22] Filed: Sep. 29, 1994

[51] Int. Cl.⁶ .................................................. F02B 43/00
[52] U.S. Cl. .......................... 123/1 A; 123/25 R; 123/525
[58] Field of Search ............................... 123/1 A, 27 GE, 123/525, 526, 527, 25 R, 3

[56] References Cited

U.S. PATENT DOCUMENTS

| | | | |
|---|---|---|---|
| 3,732,693 | 5/1973 | Chu | 60/207 |
| 4,210,553 | 6/1980 | Osborg | 44/52 |
| 4,296,723 | 10/1981 | Aldrich | 123/25 R |
| 5,081,977 | 1/1992 | Swenson | 123/1 A |
| 5,150,690 | 9/1992 | Carter et al. | 123/527 |
| 5,372,619 | 12/1994 | Greinke et al. | 123/1 A |

Primary Examiner—David A. Okonsky
Attorney, Agent, or Firm—Oblon, Spivak, McClelland, Maier & Neustadt, P.C.

[57] ABSTRACT

An automotive vehicle is described having on-board storage of free natural gas and natural gas combined with water to form a hydrate. The natural gas is preferably a mixture of methane and about 1% propane. It is provided with hollow metal plates. Cooling fluid can be circulated through the plates to form the hydrate and heating fluid can be circulated through the plates to decompose the hydrate. The pressure within the storage container is preferably between 450 and 850 psig. The free natural gas within the container can be used to start and warm the engine. The vehicle air conditioning system is used to cool the circulated fluid and the vehicle radiator and/or exhaust is used to heat the circulating fluid. The container is insulated with multiple layers of heat reflective material, e.g., aluminum foil, separated by glass fiber felt. Preferably, the layers are sealed and the space between the layers is maintained under a vacuum. The natural gas is conveyed by the pressure within the tank through a conventional pressure regulator to the vehicle engine. A molecular sieve column is provided to remove moisture from the natural gas as it is conveyed to the engine.

47 Claims, 4 Drawing Sheets

GAS HYDRATE STORAGE SYSTEM AND METHOD FOR USING THE GAS HYDRATE STORAGE SYSTEM IN AUTOMOTIVE VEHICLES

BACKGROUND OF THE INVENTION

1. Field of the Invention

This invention will allow for the replacement of previously used motor fuels including gasoline and diesel fuel, in order to improve the quality of the environment. In particular this invention relates to an apparatus for storing natural gas (i.e., gas compositions which are constituted primarily of methane but which may contain minor amounts of other components such as ethane, propane, I-butane, N-butane and/or nitrogen) in hydrate form and to a method of using the apparatus to provide for safe and clean automotive use of a practical alternative fuel.

2. Discussion of the Background

The search for alternative transportation fuels has expanded in recent years. The need for alternative fuels to replace gasoline has been accelerated by environmental concerns, concerns of shortage of imported liquid hydrocarbon, and Congressional prompting. The environmental concerns stem from the fact that gasoline combustion emits nitrogen oxides, particulates, carbon monoxide, and hydrocarbons that cause air pollution. The U.S. consumption of crude oil processed for gasoline was 7.15 million barrels per day in 1991. The first conversions from gasoline to compressed natural gas are occurring with fleet vehicles where 30,000 were in service in the U.S. in 1991 with the number expected to grow 80,000 by the year 2000. Furthermore, proposed legislation such as the Federal 1990 Clean Air Act amendments demonstrates the great need for conversion to alternative fuels in the United States.

Natural gas is the cleanest burning fossil fuel. This feature has stimulated interest in natural gas as an alternative to gasoline for fueling automobiles. Natural gas has an octane number of 120, burns with no particulate matter emitted, and emits one-third less carbon dioxide than gasoline. Further, compared to other fossil fuels, compressed natural gas has the highest energy content per unit weight but the lowest energy content per unit volume. But the means of maximizing natural gas on-board in a practical and safe manner has been difficult. Storage as a hydrate offers added safety, greater storage capacity, lower pressures, and cheaper storage.

Although gas storage of hydrates has been suggested, no mention has been made prior to this invention of on-board vehicle storage of hydrates. Previous publications on the possible non-vehicular storage of hydrates evaluate the use of hydrate storage of natural gas in permafrost regions and beneath the ocean floor to meet daily and seasonal variations of gas consumption. A few patents have also been granted on the bulk storage of hydrates. However, none of the structures in these references is suitable for storing hydrates on a land-based vehicle.

Other references discuss natural gas-powered vehicles in which the natural gas is stored at a reduced pressure by using a sorbent material introduced into the gas storage tank. However, these references do not employ gas hydrates.

Therefore, the need for safe storage of adequate quantities of natural gas on vehicles and a method for use of the natural gas in vehicles is growing.

SUMMARY OF THE INVENTION

Accordingly, it is an object of the present invention to provide an apparatus for storage of a large amount of hydrate-forming gases on land based motor vehicles.

Another object of the present invention is to provide a method for use of the stored hydrate-forming gases as a fuel for automobile vehicles by providing a method for controlled decomposition of the hydrate for feeding a suitable prime mover, such as an internal combustion engine.

A further object of the present invention is to provide an apparatus and method for storing natural gas at lower pressures. A related object of the present invention is to provide safe on-board containment of the gas by providing for slow decomposition upon sudden pressure release, thereby preventing an explosion due to possible on-board tank rupturing.

It is further an object of the present invention to improve the capacity of on-board gas storage by providing a storage tank for hydrate-forming gases which is decreased in weight.

Another related object of the present invention is to provide for large quantities of gas to be stored in order to provide good vehicle mileage between refueling.

An another objective of the present invention is to control the composition of hydrocarbons in the fuel to the engines. The hydrates will exclude hydrocarbons heavier than butane, which cause fuel stratification in compressed natural gas cylinders, reduce fuel control, decrease engine performance, increase emissions, and create detonation resistance of the fuel that results in engine knock and frequent failures.

The above objectives have been met by the present invention which provides for a storage tank or container for hydrate-forming gases and a method for use of the hydrate-forming gases in automotive vehicles. The storage tank for hydrate-forming gases comprises a) a tank having insulated walls enclosing at least one chamber for storing hydrate; b) a gas inlet in one of the walls and a gas outlet in one of the walls; c) at least one plate attached to one or more of the walls adapted to be heated or cooled as needed; d) means for heating or cooling the plate or plates; e) a relief valve operatively positioned in one of the walls; f) a water inlet in one of the walls for adding water to the tank; g) and means for circulating water from the bottom of the tank back to the top of the tank.

The above objectives have further been met by providing a method of supplying natural gas to a vehicle engine comprising the steps of: a) storing natural gas hydrate in an insulated tank enclosing at least one chamber, said tank having a gas inlet in one wall and a gas outlet in the same or a different wall; b) said chamber including at least one plate; c) heating said plate or plates so as to transform solid hydrate formed on the surface thereof into natural gas; d) conveying the natural gas produced to the engine; d) circulating water of hydration through the chamber; e) and cooling the plate or at least one of the plates, when a plurality of plates are used, so as to retransform the natural gas remaining in the chamber into hydrate. Natural gas may be added to the chamber from time to time as needed to replenish that used by the engine.

The above invention overcomes safety, space and weight constraints of the compressed natural gas, providing safe storage even under circumstances of tank rupture that might occur during a collision.

The present invention uses the concept of clathrate hydrates which are substances resulting from the cage-like inclusion of molecules of hydrocarbon gases such as methane, ethane, propane, and butane in the "holes" or "cages" in the host lattice of hydrogen bonded water molecules. The complex may be handled in solid form and the included constituent subsequently released by the action of a solvent or by melting. Natural gas hydrates can be decomposed by one of three methods: a) injecting methanol, b) lowering the pressure, or c) raising the temperature.

The arrangement of natural gas trapped in a lattice of water molecules has important ramifications for the safe use of natural gas in vehicles. First of all, the gas is desensitized in the water. Therefore, a sudden loss of storage pressure in the case of a collision would result in a slow release of the stored gas.

In the disclosed process, solid-phase ice-like hydrates are formed by contact of natural gas and water at temperatures above the freezing point of pure water up to 60° F. and at pressures from 380–2000 psig. The process optimizes temperature, pressure, and gas content for application in vehicles. A small amount of propane (approximately 1 percent) improves pressure and temperature requirements for formation of hydrates, increases the storage quantity of fuel in the fuel tank and improves fuel storage capability in the fuel tank at lower pressures.

Therefore, an advantage of the present invention is that the slow release of natural gas from a solid hydrate at a controlled rate can prevent an explosion resulting from tank rupture in the case of a collision. The crystalline structure of water surrounding the gas in the solid phase stabilizes the gas while on-board and makes it safer for transportation. Accordingly, if the pressure is suddenly reduced, the natural gas will still be slowly released from solid hydrate at a controlled rate. Natural gas encased in ice in storage makes natural gas more acceptable to consumers because of the added safety.

In addition to providing safe on-board containment of natural gas, and a reduction of the possibility of explosion in the result of on-board tank rupture, the present invention further allows for safe storage of natural gas at lower pressures, improves the capacity of on-board gas storage, decreases the weight of the tank system, and selectively supplies the lighter and lower-polluting hydrocarbons to the engine.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
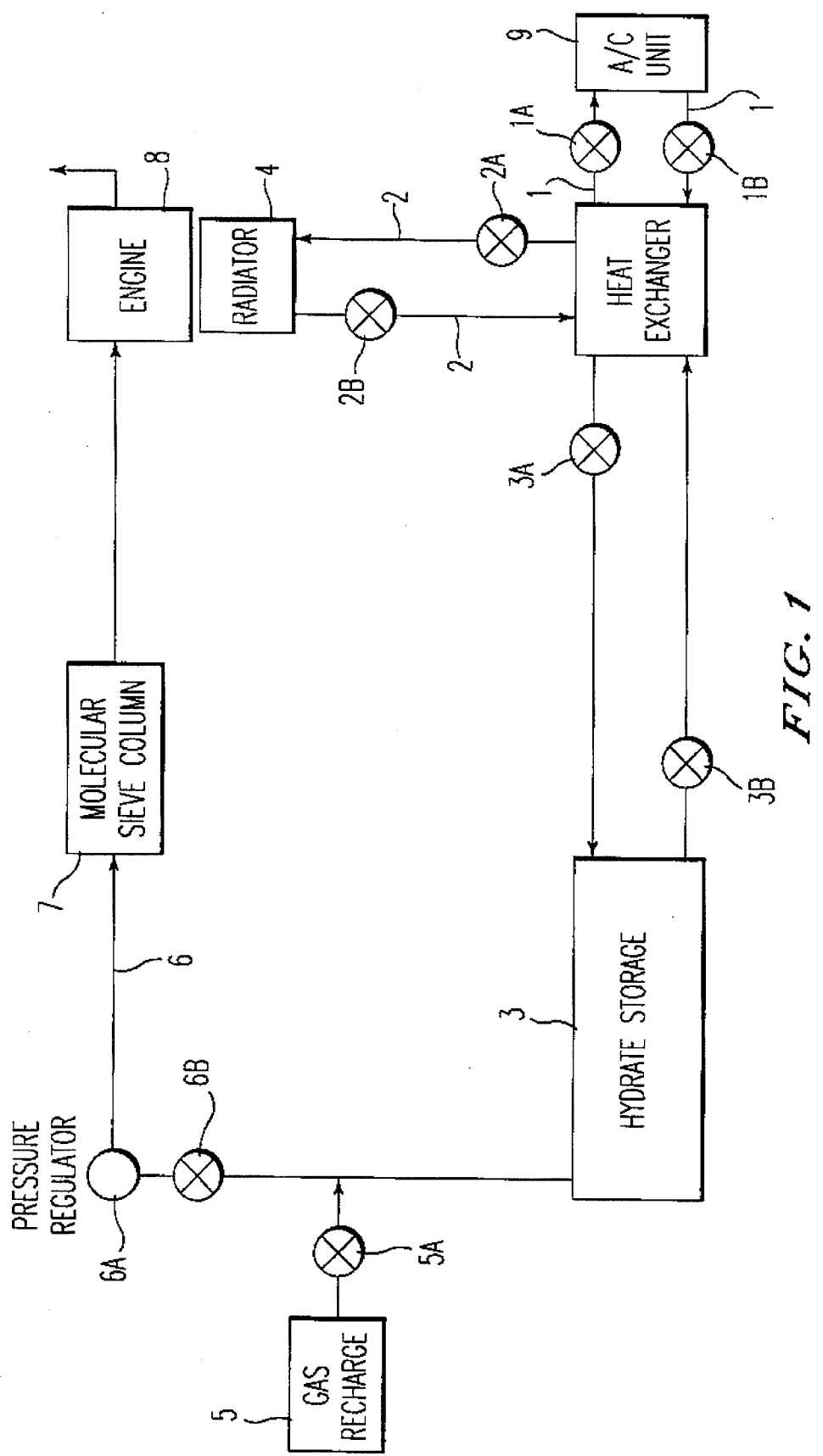
FIG. 1 is a block diagram showing the functional relationship among the hydrate storage tank, the vehicle engine, and other components of the present invention.

A block diagram of the system used in vehicles is shown in FIG. 1. In order to reform hydrate, the fluid circulating in the lines 1HE extending from the heat exchanger HE to the tank 3 may be cooled in the heat exchanger HE by fluid circulating through the lines 1 extending from the air conditioning unit 9 to the heat exchanger HE. The cooled fluid passes through one or more hollow metal plates in the hydrate storage tank 3 in the closed loop between the heat exchanger and hydrate tank. The circulation of the cooling fluid causes the temperature in the hydrate storage tank to decrease which, coupled with the recirculation of the water of hydration, solidifies the natural gas into a hydrate. The reuse of the water may facilitate more rapid and easier formation and reformation of the hydrate because the hydrogen-bonded cage structure of the water may be left partially intact upon decomposition of the hydrate.

In order to decompose the solid hydrate to form natural gas for fueling the engine 8, waste heat from the radiator 4 or other waste heat removal system of the engine 8 is circulated through the heating lines 2 extending between the heat exchanger HE and the radiator 4. The fluid circulated through the lines 1HE extending from the heat exchanger HE to the tank 3 may be heated in the heat exchanger HE by the fluid circulating through lines 2. The heating fluid circulates on the interior of selected plates, raising the temperature on those plates and thereby causing decomposition of the hydrate on those plates into natural gas.

The flow of fluid through lines 1 is controlled by valves 1A and 1B; the flow of fluid through lines 2 is controlled by valves 2A and 2B; and the flow of fluid through lines 1HE is controlled by valves 3A and 3B.

A natural gas recharge line 5 is also shown in FIG. 1. The recharge line has a quick connect and disconnect valve 5A.

A fuel line 6 runs from the hydrate storage tank 3 through a molecular sieve column 7 to the engine 8. The natural gas is pressure driven and no fuel pump is required. A conventional pressure regulator 6A is placed in the fuel line 6 to control the pressure of the natural gas fed to the engine at the desired level.

The function of the molecular sieve column 7 is to remove trace moisture from the natural gas conveyed from the tank to the engine. Parallel columns may be present which alternatively adsorb and regenerate. The regeneration occurs from waste engine heat obtained from the radiator and/or the exhaust system.

Figure 2:
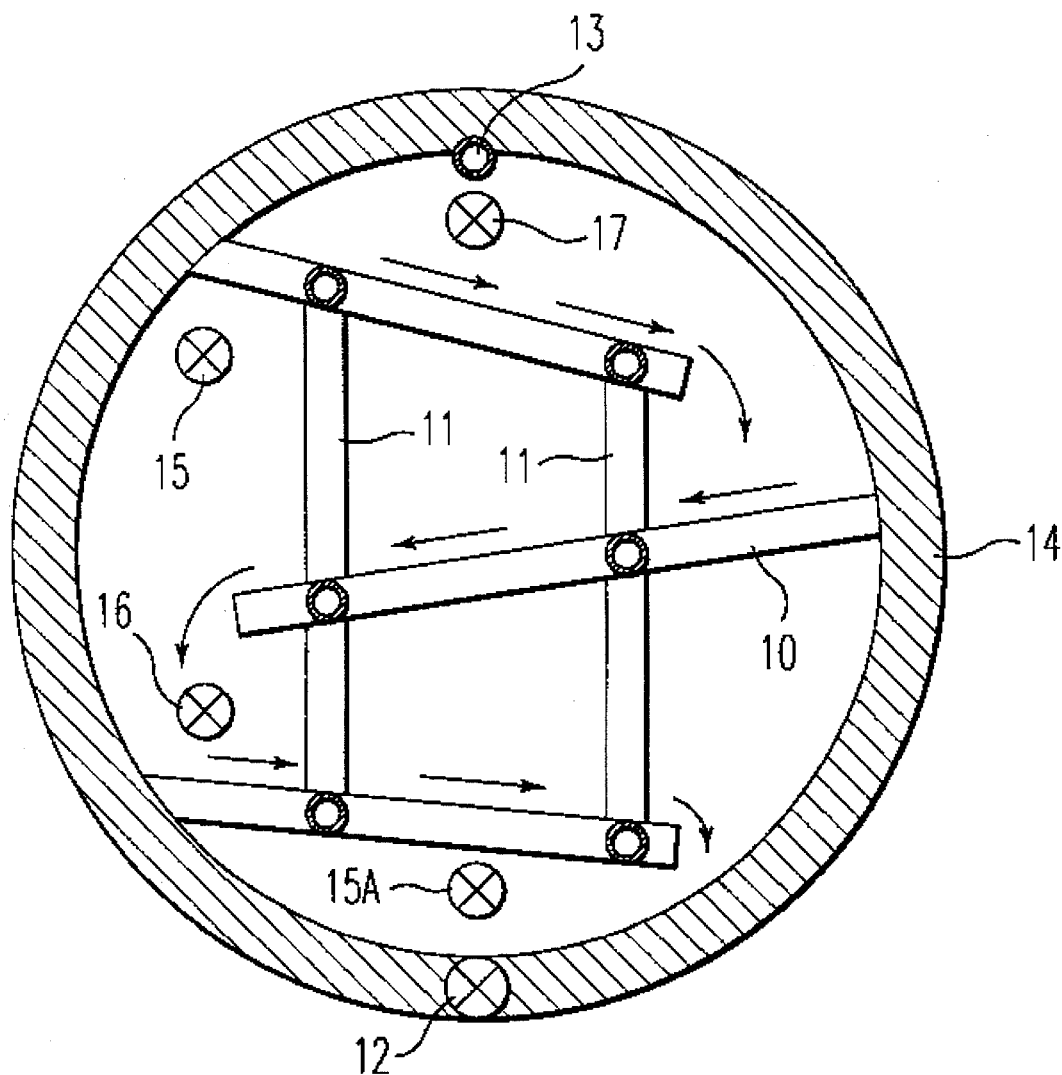
FIG. 2 is an end view of a hydrate storage tank.
Figure 3:
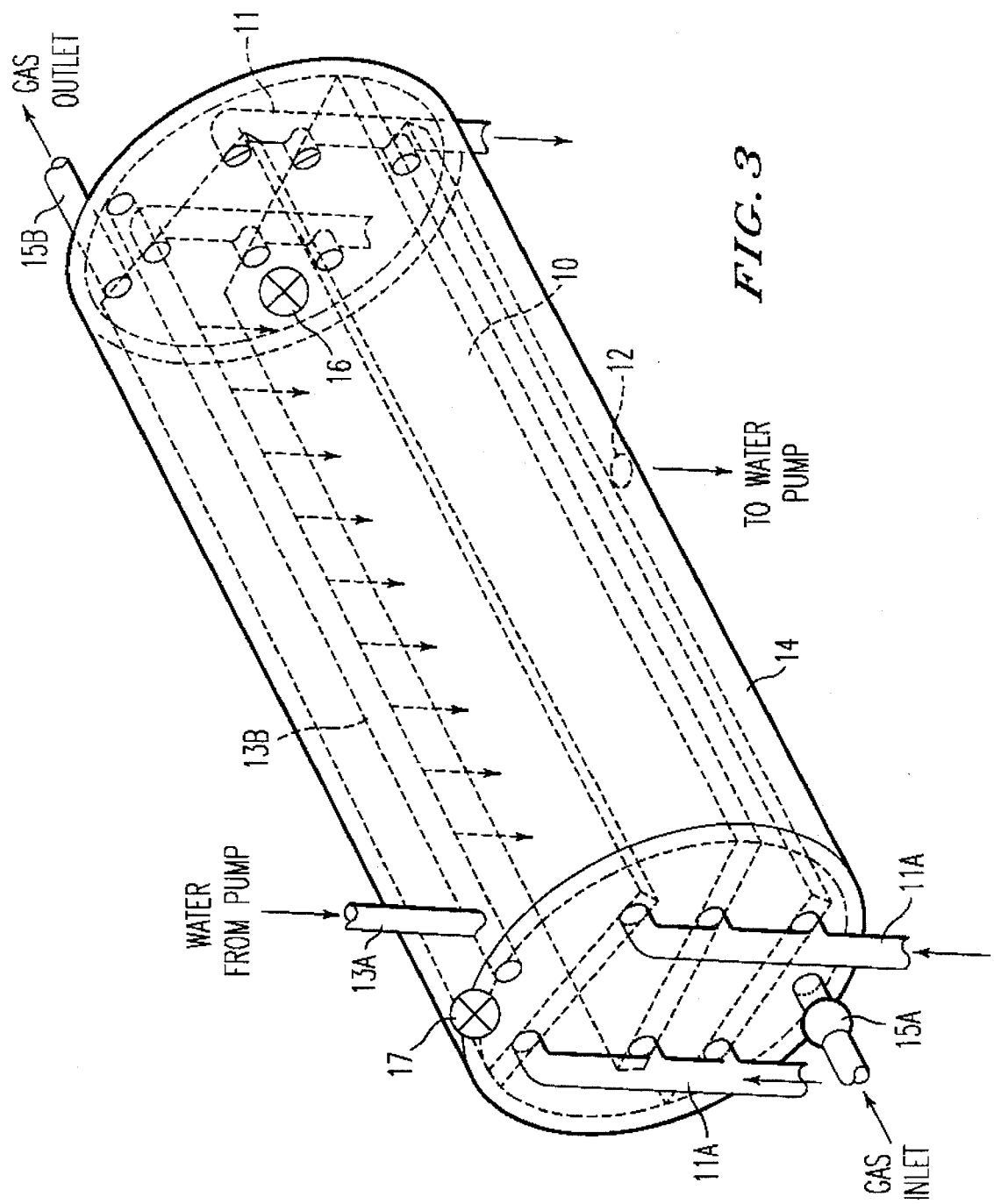
FIG. 3 is a side view of a hydrate storage tank.

FIG. 2 and FIG. 3 depict the end and side views of the hydrate storage tank or container 3. Depending on whether hydrate is being decomposed into natural gas for fuel or whether hydrate is being reformed for storage, the fluid in lines 1HE, either heated or cooled, is supplied to the hollow plates 10. For reforming the hydrate, refrigerant from the air conditioning unit cools the circulating fluid in a heat exchanger HE of FIG. 1 and cooled fluid then circulates through the inlet manifold 11A to the hollow aluminum plates 10. The cooled fluid then circulates through the hollow plates 10 and through outlet manifold 11. A pump circulates water from a lower water outlet 12 to an upper water inlet 13A connected to a perforated conduit or sprayer 13B. Water is sprayed from the conduit onto the upper hollow plate and flows over that plate and each lower plate in turn. Some of the water and natural gas combine to form hydrate, and the remaining water returns to the bottom of the tank where it is again pumped from outlet 12 back to inlet 13A. The natural gas forms hydrate by solidifying on the outer surface of the hollow aluminum plates 10 as it contacts the water which has been chilled to 35°–45° F. by the hollow aluminum plates 10. A water-refill valve 17 is also present on the tank.

In order to decompose the hydrate, the fluid circulating in a closed loop from the hollow plates and to the heat exchanger is heated in the heat exchanger by the radiator fluid. The solid hydrate formed on the outer surface of the hollow plates 10 is thereby decomposed into natural gas and water. The natural gas then may be released through the gas outlet 15B. A gas inlet 15A is provided in one side of the tank. A pressure relief valve 16 is also present on the tank.

The tank has an insulated casing or jacket 14 with inner and outer walls to allow for insulation. In a preferred embodiment of the invention, the tank may have the structure common for tanks storing liquefied natural gas at much lower temperatures. The preferred insulation reduces radiative, conductive, and convective heat losses with multiple layered reflectors (aluminum foil commonly used) held apart by glass fiber felt between the walls. The insulating value of the casing is increased by maintaining a vacuum between the walls.

The hollow plates 10 should be constructed of a material that maximizes heat transfer and minimizes corrosion; high strength material is not necessary. Aluminum, composite materials, or metal alloys are suitable materials for use in constructing the hollow plates.

Hydrate tank dimensions will vary depending upon the space available on the vehicle in which they are used. Tanks ranging in diameter from approximately 8 inches to approximately 20 inches and ranging in length from approximately 35 inches to approximately 80 inches are distributed by, inter alia, Comdyne, Inc. for natural gas powered vehicles. They may also be used for the hydrate tanks of the present invention.

There are currently two standards for compressed natural gas cylinders: the DOT-E10256 and the NGV-2. Since hydrate tanks are not required to withstand the high pressures to which compressed natural gas cylinders are subjected they can be built from lighter weight materials but may correspond in diameter and length to conventional compressed gas cylinders. These two parameters vary according to the vehicles and the location in the vehicles where they are placed.

The strength and heat transfer properties of the inlet and outlet manifolds are relatively unimportant compared to their corrosion resistance. Accordingly, a stainless steel construction of the manifolds is recommended. Water pumps come in a variety of sizes and are conventional in the art. The water pump is not further described since those skilled in the art can easily select a water pump suitable for use in the present invention.

Some of the natural gas forms a hydrate in the storage tank as the gas flows from the bottom of the tank through water which has been chilled to 32°–60° F. due to the presence of cooling fluid passing through the aluminum plates. The preferred chilled temperature range for the water is from about 35° to about 45° F. At the completion of the hydrate forming process, the pressure in the storage tank may be in the range of 380–2000 psig. The preferred range of pressure in the storage tank, upon completion of the hydrate forming process, is between about 450 to about 850 psig. Gas flow is continued until the desired pressure is obtained. Induced turbulence at the gas-water interface, due to the gravitational drainage of the water over the plates in the tank, renews the liquid surface and speeds up the hydration formation.

Dissociation of natural gas from the hydrate is achieved by increasing the temperature of the solid hydrate by circulating waste heat from the engine through the plates or by draining the excess gas in the free state, causing a controlled pressure drop. Free excess natural gas in the tank during and after completion of the hydrate formation process is used to start and run the engine while it warms up. The preferred operating temperatures in the storage tank are from about 35° to 40° F. Due to the high insulating value of the tank casing 14, heat loss from the tank while the engine 8 is not running is very low. However, any dissociation of natural gas from the hydrate during that period provides more natural gas in the free state which will be available for the next engine start.

Pipeline natural gas, propane, methane, or a combination of both propane and methane can be used as the gaseous hydrocarbon gas in the present invention. In a preferred embodiment of the invention, small amounts of propane are used to increase the gas content and ease of formation of the hydrate at a given pressure and temperature, especially in the ranges of about 450 to about 850 psig and about 30° to about 45° F. The propane allows hydrate formation pressure to be reduced for a given gas content and temperature.

Approximately 5250 liters (185.4 SCF) of natural gas can be stored in a 38 liter (1.342 cubic feet) cylinder filled with hydrate of Structure I (discussed infra.) at about 3.6 MPa (500 psig) and 0° C. (32° F.). This represents 91.5% of the compressed natural gas that can be stored in the same volume of tank at 2000 psig.

The range of travel of a vehicle incorporating the tank or tanks disclosed herein depends on such factors as the size of the engine, the weight of the vehicle, and the volume of the tanks.

A laboratory experiment conducted at 750 psig and approximately 38.5° F. using a gas composition consisting in mole percent of 96.353 methane, 1.22 ethane, 2.4 propane, 0.009 I-butane, 0.001 N-butane, and 0.011 nitrogen resulted in a hydrate with a gas storage capacity of 158.82 vol/vol. That is, 158.82 liters of that gas composition at standard temperature and pressure can be stored in 1 liter of hydrate in a tank at 750 psig 38.5° F.

The density of the gas mixture at standard conditions is given by the following:

$$\rho = \frac{MP}{RT}$$

Where

R=Universal gas constant 0.0821 (ATM) (liter)/(g-mole) (K)

P=Standard pressure=1 atm

T=Standard temperature 60° F.=288.75° K

M=Molecular weight of gas gravity of the gas×$M_{air}$= 0.582×28.96=16.87

$$\rho = \frac{16.87 \times 1}{0.0821 \times 288.75}$$

$\rho$=0.7116 g/l

For 158.82 l/l, in 1 liter there are m=0.7116 g/l×158.82 l/l=113.02 g where m=mass of gas Heat of Combustion, gasoline=10.5 kcal/g 18,900 Btu/lb Heat of Combustion, natural gas=11.56 kcal/g (i.e., the tested composition) 20,800 Btu/lb Average density of unleaded gasoline=0.7375 g/cm$^3$ Under these conditions, 113.02 g of natural gas (i.e., the tested composition) provides the following amount of energy:

$$Q_g = 113.02 \text{ g} \times 11.56 \text{ kcal/g}$$
$$= 1306.5 \text{ kcal}$$

The amount of gasoline that would supply the same amount of energy:

$m_1 = 1306.5$ kcal/10.5 kcal/g$= 124.43$ g gasoline

The volume of gasoline that would supply the same amount of energy as 1 liter of hydrate:

$v_1 = 124.43/0.7373 = 168.7$ cm$^3$$=0.169$ liter

Thus, 1 liter of hydrate formed at 750 psig and 38.5° F. with gas of the given composition will contain 0.169 liter equivalent of gasoline.

Figure 4:
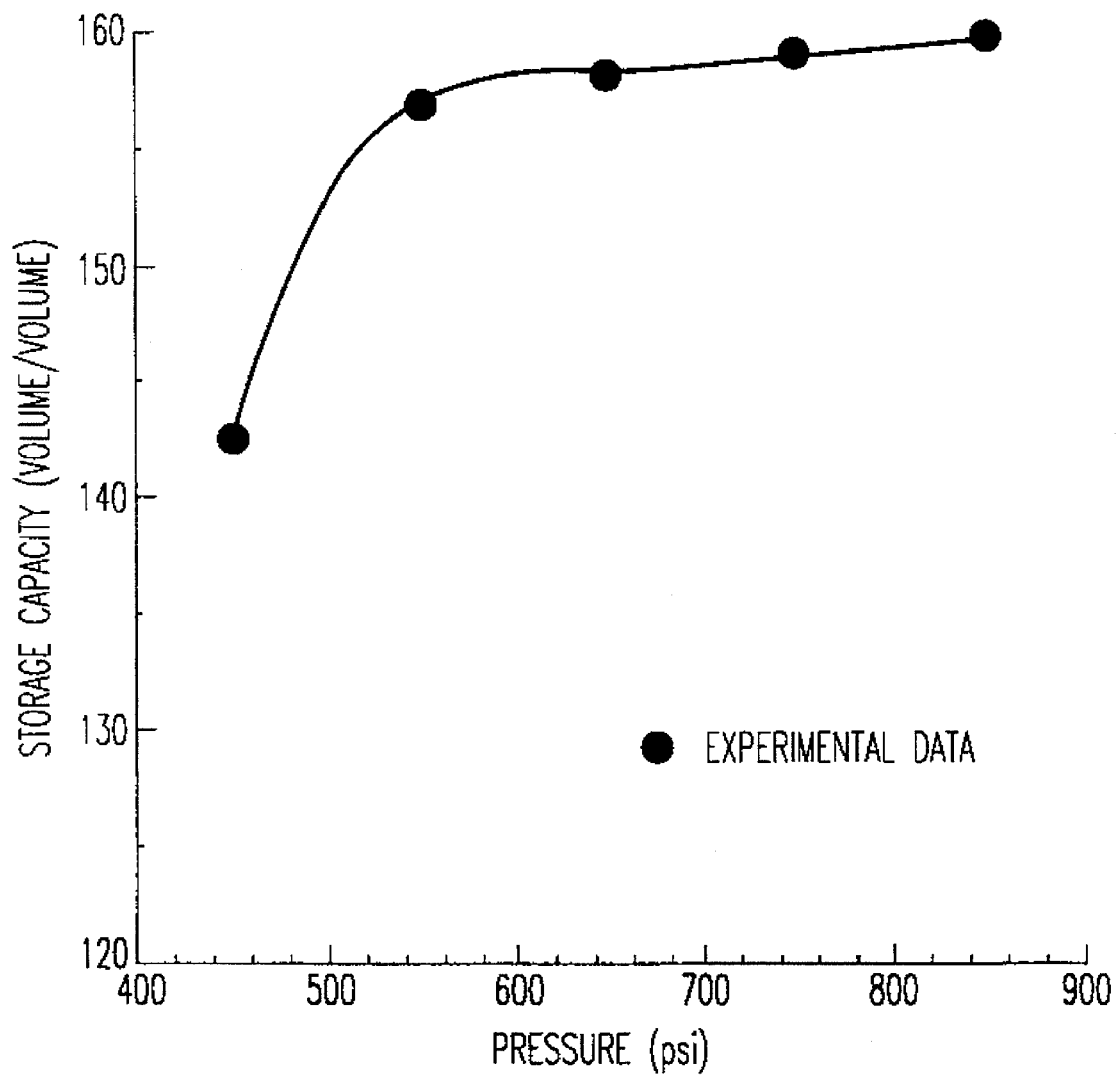
FIG. 4 illustrates hydrate storage capacity as a function of pressure.

FIG. 4 presents the storage capacity as a function of pressure for several difference experimental runs. FIG. 4 shows that for the given gas composition, hydrate formation temperatures between 38.5°–41° F. and pressure between 450–850 psig, there is an optimal pressure (550 psig) above which the increase in storage capacity is negligible. The storage capacity ranged from 142.56 vol/vol at 450 psig to 159.44 vol/vol at 850 psig. At 550 psig the storage capacity was 156.93 vol/vol. The optimal pressure (550 psi) is approximately 25% of the pressure required to obtain the same storage capacity of the gas composition in a compressed state (2306 psi). This reduction in pressure requirements would have a great impact upon the economics of NGVs.

In addition to reducing the high-pressure fuel storage requirements in NGVs, the storage of fuel in hydrates for NGVs would greatly reduce the cost of compressors, high pressures tubing connections, and storage vessels.

A typical vehicle operating on compressed natural gas contains 3 cylinders of 12 in (30.5 cm) diameter of the two cylinders are 35 in (89 cm) long and one is 50 in (127 cm) long. Geiss, O. R. et al., "Technical High lights of the Dodge Compressed Natural Gas Ram Van/Wagon," SAE Technical Paper Series 920593, Society of Automotive Engineers, Warrendale, Pa., 1992.

Total vol of 3 cylinders:

$$V = \left[ 2 \frac{\pi (30.5)^2}{4} \times 89 + \frac{\pi (30.5)^2}{4} \times 127 \right] \times \frac{1}{10^3 \text{ cm}^3}$$

$V = 222.8$ liters

Thus, if all 3 cylinders were filled with hydrate, they would contain:

$$V_{hydrate} = 222.8 \text{ liters gasoline} \times 0.169 \frac{\text{liters hydrate}}{\text{liters gasoline}}$$

$V_{hydrate} = 37.66$ liters$=9.95$ gal

The vehicle would travel:

13.4 miles/gal×9.95 gal=133.32 miles/refill (on highway+ city streets) or, 20.5 miles/gal×9.95 gal=203.97 miles/refill (on highway).

As discussed earlier, upon completion of the hydrate formation process, there will be excess gas left in the hydrate tank. This gas will be used to start the engine and run it while it warms up. This excess gas will be at the hydrate formation pressure. It will thus flow to the engine under this pressure, without a fuel pump. A one-stage regulator 6A can be used to lower the pressure to its final setting before the mixer.

When heat is supplied to the hydrate, the release of the gas begins. The total amount of gas released is not used to fuel the engine. Therefore, the pressure in the hydrate tank will be enough to allow for the gas to flow under its own pressure, i.e., without a fuel pump.

The hydrate storage tank can be used as a substitute for the compressed natural gas tanks in natural gas powered vehicles. The hydrate concept is only a fuel storage system and does not require any other modifications of the existing natural gas vehicle engines.

There are two different structures of gas hydrates. Structure I contains 46 water molecules enclosing 8 cavities, and Structure II has 136 water molecules enclosing 24 cavities. Table I lists the properties of the two hydrate lattices. Either type of gas hydrate is useful in the present invention.

The properties of gas hydrate lattices are given below in Table I.

TABLE I

Properties of Gas Hydrate Lattices

| Property | Structure I | Structure II |
|---|---|---|
| Unit cell size (angstroms) | 12.0 | 17.4 |
| Number of H$_2$O molecules per unit cell | 46 | 136 |
| Number of small cavities per unit cell | 2 | 16 |
| Number of large cavities per unit cell | 6.0 | 8.0 |
| Formula | | |
| all cavities filled | M-5.75 H$_2$O | M-5.67 H$_2$O |
| large cavities filled only (where M is a gas molecule) | M-7.67 H$_2$O | M-17 H$_2$O |
| Free diam of small cavities (angstroms) | 5.1 | 5.0 |
| Free diam. of large cavities (angstroms) | 5.8 | 6.7 |
| Volume increase (relative to ice %) | 15.3 | 17.3 |

The composition of gas hydrate is commonly expressed in terms of hydrate number, the ratio of H$_2$O molecules to gas molecules in the hydrate. The maximum hydrocarbon concentration corresponds to the lowest hydrate number. For Structure I the lowest hydrate number is 5.75, if all cavities of filled, or 7.67, if only the large cavities are filled. For Structure II, the minimum hydrate numbers are 5.67, if all cavities are filled, or 17.0, if only the large ones are occupied. For Structure I, if all cavities are filled, the maximum hydrate number reported for methane hydrate is about 9. The equilibrium value for methane hydrate at 0° C. (32° F.) and 2.6 MPa (377 psig) is 7.

Table II provides the weight of the gas storage hardware for pressurized, adsorption, and hydrate storage of natural gas. In the DOE report No. DOE/NASA/0327-1, the weight of the tank for natural gas storage by adsorption was assessed for a Ford Tempo GL-5 speed passenger car, whose performance characteristics were expected to be very sensitive to changes in weight and fuel consumption. It was found that the additional weight of adsorption storage had little effect on the vehicle's performance.

The weight of three tanks, of the type described in the report, full of hydrate, which would meet the 150 miles range, is only 13.5% higher than that of adsorption storage. It should be pointed out, however, that the aluminum-fiberglass cylinders described in the report are designed for an operating pressure of 3000 psig and a burst pressure of 7500 psig. These pressure requirements make them extremely heavy. Because of the low pressure of hydrate storage, the weight of the tank might be reduced considerably. This would lead to a total weight of the system of the invention which is even lower than the weight for adsorption storage.

TABLE II

Weight of Gas Storage Hardware

| | Weight (Kg) | | |
|---|---|---|---|
| | 1 tank | 2 tank | 3 tank |
| Adsorption storage | | | |
| Fuel | 3 | 6 | 7 |
| Tanks | 28 | 56 | 84 |
| Brackets | 15 | 30 | 45 |
| Manifold | 30 | 30 | 30 |
| Carbon | 22 | 44 | 66 |
| Total | 98 | 165 | 230 |
| Pressurize storage | | | |
| Fuel | 6 | 12 | 18 |
| Tanks | 28 | 56 | 84 |
| Brackets | 10 | 20 | 30 |
| Conversion kits | 25 | 20 | 25 |
| Total | 69 | 113 | 157 |
| Hydrate storage | | | |
| Tanks | 28 | 56 | 84 |
| Brackets | 15 | 30 | 45 |
| Manifolds | 30 | 30 | 30 |
| Fuel in hydrate state | 34 | 68 | 102 |
| Approx. total | 107 | 184 | 261 |

The properties of Clathrate hydrates of natural gas make them well suited for storage and use as fuel for automotive vehicles. Those properties include:

1. The solid hydrates can be easily generated (for refueling the vehicle).
2. Large quantities of gas can be stored in the solid matrix (provide good vehicle mileage between refueling).
3. A controlled decomposition of the hydrate is possible (for feeding an internal combustion engine).
4. A slow decomposition upon sudden pressure release (safety feature in case of a collision).

A small amount of propane can be added to methane to substantially lower the storage pressure of the hydrate. The low pressure range of hydrate formation, as well as the gradual rate at which it decomposes to release the gas, favors application of this storage technique for natural gas powered vehicles. The addition of a small amount of propane provides not only an increased fuel volume at lower pressures in order to achieve high mileage between refueling, but also the hydrates formed therefrom provide a high-level of storage safety.

What is claimed as new and desired to be secured by Letters Patent of the United States is:

1. A tank for storing gaseous hydrocarbon fuel and water at least some of which is in the form of a solid hydrate, comprising:
   (a) a container for storing a mixture of gaseous hydrocarbon fuel, gaseous hydrocarbon fuel hydrate, and water under pressure;
   (b) a first inlet for adding gaseous hydrocarbon fuel to said container under pressure;
   (c) a second inlet for adding water to said container under pressure;
   (d) a plate mounted within said container in spaced relation to the top, bottom, and at least one side of said container;
   (e) first lines adapted to circulate a fluid in contact with said plate; and
   (f) a heat exchanger for selectively cooling said fluid to thereby cool said plate below the temperature where at least some of the gaseous hydrocarbon fuel and water within the container combine to form a solid hydrate and heating said fluid to thereby heat said plate above the temperature where at least some of the solid hydrate decomposes to release free gaseous hydrocarbon fuel.

2. A tank according to claim 1, further comprising a fuel line for conveying the gaseous hydrocarbon fuel from said container to a gaseous hydrocarbon fuel burning apparatus.

3. A tank according to claim 1, wherein said plate is a hollow metal plate.

4. A tank according to claim 3, wherein said first lines are connected to said hollow metal plate for circulating the fluid through the interior of said plate.

5. A tank according to claim 1, wherein said container includes a plurality of plates arranged in spaced relationship to each other and to the top, bottom, and at least one side of the container and said first lines are adapted to circulate fluid through at least one of said plates.

6. A tank according to claim 5, wherein said plates are secured along one edge to a side of the container, and wherein odd numbered plates are secured to one side of the container and even numbered plates are secured to the opposite side of the container.

7. A tank according to claim 6, wherein each plate extends toward but terminates short of the side of the container opposite the side of the container to which the plate is attached.

8. A tank according to claim 7, wherein each of said plates inclines slightly downward from the horizontal from the side of the container to which it is attached.

9. A tank according to claim 8, further comprising a pump circuit for recirculating the water from the bottom of the container back to the top of the container.

10. A tank according to claim 9, further comprising spray means adjacent the top of said container connected to said pump circuit for spraying water toward said plate or plates.

11. A tank according to claim 1, wherein said tank is covered with insulation comprising multiple layers of heat reflective material separated by glass fiber felt.

12. A tank according to claim 11, wherein said layers of heat reflective material comprise aluminum foil.

13. A tank according to claim 12, including means securing said layers of heat reflective material together to form an air tight enclosure.

14. A tank according to claim 13, wherein the space between said layers of reflective material is maintained under a vacuum.

15. A motor vehicle, comprising:
   (a) a prime mover adapted to convert gaseous hydrocarbon fuel and air into mechanical energy for driving said vehicle;
   (b) a container mounted on said vehicle for storing a mixture of free gaseous hydrocarbon fuel, gaseous hydrocarbon hydrate, and water under pressure; and
   (c) means for conveying said gaseous hydrocarbon fuel from said container to said prime mover.

16. A motor vehicle as claimed in claim 15, further comprising:
   (a) a metal plate mounted in said container; and
   (b) a heat exchanger for selectively cooling said plate below the temperature where at least some of the gaseous hydrocarbon fuel and water within the container combine to form a solid hydrate or heating said plate above the temperature where at least some of the solid hydrate decomposes to release free gaseous hydrocarbon fuel.

17. A motor vehicle according to claim 16, wherein said plate is hollow and further comprising:
   (a) first lines adapted to circulate fluid through the plate; and
   (b) said heat exchanger selectively cools or heats the fluid circulating through said first lines.

18. A motor vehicle according to claim 17, wherein said container includes a plurality of metal plates arranged in spaced relationship and said first lines are adapted to circulate fluid through at least one of said plates.

19. A motor vehicle according to claim 18, further comprising means securing said plates along one edge to a side of the container, and wherein odd numbered plates are secured to one side of the container and even numbered plates are secured to the opposite side of the container.

20. A motor vehicle according to claim 19, wherein each plate extends toward but terminates short of the side of the container opposite the side of the container to which the plate is attached.

21. A motor vehicle according to claim 20, wherein each of said plates inclines slightly downward from the horizontal from the side of the container to which it is attached.

22. A motor vehicle according to claim 15, further comprising a pump circuit for recirculating water from the bottom of the container back to the top of the container.

23. A motor vehicle according to claim 22, further comprising spray means adjacent to the top of said container connected to said pump circuit for spraying water towards said plate to aid in forming the solid hydrate by continuously renewing the water-gaseous hydrocarbon fuel interface as solid hydrate builds up on the outer surface of said plate.

24. A motor vehicle according to claim 17, further comprising:
   (a) an air conditioning system on said motor vehicle;
   (b) second lines extending from said air conditioning system to said heat exchanger for circulating a cooling fluid through the heat exchanger to cool the fluid in said first lines;
   (c) a waste heat removal system on said vehicle; and
   (d) third lines extending from said waste heat removal system to said heat exchanger for circulating a heating fluid through the heat exchanger to heat the fluid in said first lines.

25. A motor vehicle according to claim 15, wherein the means for conveying gaseous hydrocarbon fuel to the prime mover includes means for removing moisture from the gaseous hydrocarbon fuel.

26. A motor vehicle according to claim 25, wherein said means for removing moisture comprises a first molecular sieve column.

27. A motor vehicle according to claim 24, wherein the means for conveying gaseous hydrocarbon fuel to the prime mover includes means for removing moisture from the gaseous hydrocarbon fuel.

28. A motor vehicle according to claim 25, wherein said means for removing moisture comprises a first molecular sieve column.

29. A motor vehicle according to claim 26, further comprising:
   (a) a second molecular sieve column; and
   (b) means for alternately heating said first and second molecular sieve columns to thereby regenerate the moisture adsorbing capability of one molecular sieve while the other molecular sieve is adsorbing moisture.

30. A motor vehicle according to claim 28, further comprising:
   (a) a second molecular sieve column; and
   (b) means for alternately heating said first and second molecular sieve columns to thereby regenerate the moisture adsorbing capability of one molecular sieve while the other molecular sieve is adsorbing moisture.

31. A method of supplying gaseous hydrocarbon fuel to a vehicle equipped with a prime mover adapted to convert gaseous hydrocarbon fuel and air into mechanical energy for moving the vehicle, comprising the steps of:
   (a) providing a container on said vehicle;
   (b) storing in said container a mixture of gaseous hydrocarbon fuel, gaseous hydrocarbon hydrate, and water under a pressure; and
   (c) conveying gaseous hydrocarbon fuel from said container to said vehicle prime mover for operation thereof.

32. A method according to claim 31, wherein said container has a metal plate mounted therein and further comprising the step of periodically cooling said metal plate below the temperature where at least some of the gaseous hydrocarbon fuel and water within the container combine to form solid hydrate.

33. A method according to claim 31, wherein said plate is hollow and further comprising the step of circulating cooling fluid through said hollow plate to cool said plate below said temperature.

34. A method according to claim 32, further comprising the step of periodically circulating heating fluid through said metal plate to heat said metal plate sufficiently to decompose some of the solid hydrate and thereby release some free gaseous hydrocarbon fuel therefrom.

35. A method according to claim 31, wherein said container includes a plurality of hollow metal plates and further comprising the step of periodically cooling one or more of said hollow metal plates below the temperature where at least some of the gaseous hydrocarbon fuel and water within the container combine to form solid hydrate.

36. A method according to claim 35, including the step of arranging said hollow metal plates so that the odd numbered plates extend from one side of the container and terminate short of the opposite side and the even numbered plates extend from the opposite side of the container and terminate short of said one side.

37. A method according to claim 36, wherein the step of arranging includes positioning the odd numbered plates so that they incline downwardly from the horizontal from said one side and positioning the even numbered plates so that they incline downwardly from the horizontal from said opposite side.

38. A method according to claim 37, further comprising the step of recirculating water from the bottom of the container back to the top of the container.

39. A method according to claim 38, further comprising the step of spraying the recirculated water onto the uppermost plate in the container whereby the water flows over the upper surface of the top plate and each succeeding lower plate to aid in forming solid hydrate by renewing the water-gaseous hydrocarbon fuel interface.

40. A method according to claim 37, wherein said motor vehicle includes an air conditioning system and further comprising the steps of circulating fluid through said hollow metal plates and using said air conditioning system to cool the fluid circulating through one or more of said hollow metal plates.

41. A method according to claim 35, further comprising the step of periodically heating at least one of said hollow metal plates above the temperature where at least some of the solid hydrate decomposes to release free hydrocarbon fuel therefrom.

42. A method according to claim 41, wherein said vehicle includes a waste heat removal system and further comprising the steps of circulating fluid through said hollow metal plates and using heat from said waste heat removal system to heat the fluid circulating through one or more of said hollow metal plates.

43. A method according to claim 31, further including the step of removing moisture from the gaseous hydrocarbon fuel as it is being conveyed from the container to said prime mover.

44. A method according to claim 43, wherein said step of removing moisture comprises directing the gaseous hydrocarbon fuel through a first molecular sieve column as it is conveyed from the tank to the prime mover.

45. A method according to claim 44, comprising the steps of:

(a) providing a second molecular sieve column;

(b) heating the first molecular sieve for regeneration thereof while the second molecular sieve is adsorbing moisture; and (c) heating the second molecular sieve for regeneration thereof while said first molecular sieve is adsorbing moisture.

46. A method according to claim 31, wherein said gaseous hydrocarbon fuel comprises about 1% propane.

47. A method according to claim 31, wherein said mixture of gaseous hydrocarbon fuel, gaseous hydrocarbon hydrate, and water are stored in said container under a pressure of about 450 to about 850 psig.

* * * * *